Patented Nov. 18, 1947

2,430,866

UNITED STATES PATENT OFFICE 2,430,866

GRANULAR N-SUBSTITUTED POLYAMIDES

Henry D. Foster, Wilmington, Del., and Arthur W. Larchar, Mendenhall, Pa., assignors to E. I. du Pont de Nemours & Company, Wilmington, Del., a corporation of Delaware No Drawing. Application February 9, 1944, Serial No. 521,658

3 Claims. (Cl. 260—72)

This invention relates to polymeric materials and particularly to improvements in the manufacture of modified polyamides in granular form.

The polyamides with which this invention is concerned are of the general kind described in U. S. Patents 2,071,250, 2,071,253 and 2,130,948 and which have been further chemically modified. Numerous examples of these polyamides are listed in Table I of U. S. Patent 2,130,948, which teaches further that filament-forming polyamides are prepared by heating the reactants beyond that point where the intrinsic viscosity of the polymer has become 0.4. The modified polyamides which, in accordance with this invention may be prepared in granular form, are the N-alkoxy-methyl polyamides. These may be prepared by condensation of an aldehyde and an alcohol with a synthetic polyamide as described in the copending applications of T. L. Cairns, S. N. 445,635, filed June 3, 1942, and S. N. 507,745, filed October 26, 1943, and also in the copending application of H. D. Foster and A. W. Larchar, S. N. 503,130, filed September 20, 1943. The improvements provided by the present invention are concerned particularly with methods for isolating the N-alkoxymethyl polyamides in finely divided granular form.

In the polyamides which are prepared by the general method described in U. S. Patents 2,071,- 250, 2,071,253, and 2,130,948, the average number of carbon atoms in the segments of the chain separating the amide groups is at least two.

These improvements are accomplished in accordance with this invention which comprises adding a controlled amount of water to an agitated solution of an N-alkoxymethyl polyamide made by reacting a synthetic linear polyamide with formaldehyde and an aliphatic alcohol in the presence of an acid catalyst whereby a dispersion of finely divided solid particles is obtained, adding further quantities of water thereby completing the precipitation and hardening the particles into firm granules. The detailed conditions for obtaining this granular solid product are hereinafter described.

The invention may be practiced by carrying out a process which comprises adding controlled amounts of water to an agitated alcoholic solution containing N-alkoxymethyl polyamide in concentration less than 25% by weight, said N-alkoxymethyl polyamide having between 20 and 45% of its carbonamide hydrogen substituted by alkoxymethyl groups, continuing the agitation whereby a slimy dispersion forms and later agglomerates, agitating the resulting agglomerated mass until redispersion occurs, and thereafter adding a further amount of water whereby the redispersed particles are hardened, and separating the hardened particles from the mother liquor.

In one specific embodiment, a dissolved N-alkoxymethyl polyamide, made by acid condensation of a polyamide with formaldehyde and an alcohol, is first neutralized with an alkaline reagent, and is thereafter treated with controlled amounts of water while stirring rapidly in producing a dispersion. This dispersion on prolonged stirring agglomerates, but as the stirring continues the agglomerated resin redisperses in the form of fine solid particles. Additional water hardens the particles into firm granules which are readily separated from the mother liquor by conventional means, such as, decantation, filtration, or centrifugation.

The condensation of polyamides with formaldehyde and alcohols may be effected by treating a polyamide, such as polyhexamethylene adipamide, with an excess of formaldehyde and an alcohol in the presence of an oxygen-containing acid catalyst, suitably with agitation in a closed vessel at 100° to 150° C. Phosphoric acid is the preferred acid-reacting catalyst. The amount of catalyst should be about 1 to 10% of the weight of polyamide used. Good results are obtained when one part of formaldehyde and one to two parts of alcohol are charged per part of polyamide. Since the reaction is rapid, proper control is best obtained by keeping the reaction mixture alkaline or neutral until the precise time at which it is desired to start the condensation. A reaction mixture which gives good results has the following composition, parts being by weight:

| | Parts |
|---|---|
| Polyhexamethylene adipamide | 100 |
| Formaldehyde | 96 |
| Water | 28.8 |
| Methanol | 125 |
| Sodium hydroxide | 0.125 |

In carrying out the condensation, this mixture is heated to reaction temperature, and then 3.6 parts of phosphoric acid (85%) is suddenly injected. By carefully controlling reaction time, degradation of the polyamide is minimized and by controlling the amount of water and aldehyde present, the degree of substitution may be varied. Thus at a reaction time of 8 minutes, about 45% or less of the available amino hydrogens are substituted by —CH$_2$O-alkyl groups. The reaction is stopped by lowering the reaction temperature and decreasing the catalyst concentration, for example, by withdrawing the reaction mixture into a quenching bath containing chiefly methanol, but which may also contain water and an alkaline material, preferably ammonia. A satisfactory quench contains:

| | Parts |
|---|---|
| Methanol | 256 |
| Water | 80 |
| Ammonia (28%) | 8 |

At least enough ammonia should preferably be present to neutralize the condensation catalyst. Any unreacted formaldehyde may also react with the excess ammonia, forming hexamethylene-tetramine. The resulting product is in main a solution of N-alkoxymethyl polyamide in the alcohol. Any solid impurities that may be present may be removed from the cooled solution by filtration or centrifuging. The resulting clear solution must be used promptly in the next operation, else gelation will occur.

The granulation operation is conducted as follows. In the first stage, water (for example, about 68 pounds per 100 pounds of the solution) is slowly introduced in the form of fine streams into the agitated solution. The result is a white slime which disperses throughout the mixture. In the second stage no further water is added but the stirring continues, and as a result the dispersion agglomerates. As the stirring continues, the agglomerated mass breaks up and redisperses. In the final stage an additional quantity of water and approximately 132 pounds per 100 pounds of quench liquor is added, with continued stirring, whereby the dispersed particles harden into small white granules. The particle size may be controlled by varying the degree and time of agitation in the interval between the start of granulation (redispersion) and the introduction of the second-stage water. With the proportions given above, precipitation is about 98% complete. The polymer can be separated from the mother liquor by conventional means such as decantation, filtration, or centrifugation. Use of a centrifuge is preferred.

The invention is further illustrated by the following example in which the parts are by weight.

*Example.*—One part by weight of polyhexamethylene adipamide, pulverized to pass a 20-mesh screen, was charged, together with 1 part of 96% paraformaldehyde, 0.188 part water, and 1.35 parts of methanol into a stirred nickel autoclave. This mixture was agitated, heated to 136° C. and a solution of 0.2 part methanol and 0.036 of 85% phosphoric acid was injected into the autoclave from a blowcase by displacing with nitrogen. After 8 minutes, during which time the temperature was maintained at 135° C., the contents of the autoclave were discharged into a solution consisting of 2.56 parts of methanol, 0.8 part of water, and 0.06 part of 28% aqua ammonia. The quenched mixture was cooled and clarified in a high-speed, hollow-bowl centrifuge. Three parts of the clarified quenched mixture was transferred to an agitated tank, and 1.38 parts of water was added slowly in the form of droplets over a period of 28 minutes. At this point a white slime was dispersed throughout the precipitation mixture. The water flow was stopped but agitation was continued. After agitating for about ten minutes, two phases could be seen as the polymer began to shrink and agglomerate. After stirring for 37 minutes, the agglomerated polymer redispersed in the form of very fine granules. At this point 3.96 parts of water was added rapidly over a 30-second interval. Agitation was continued for 15 minutes and the polymer was separated from the mother liquor by centrifugation. Less than 2.5% of the total polymer remained in solution.

The polymer was thoroughly washed and was then dried at 50° C. to give a white granular free-flowing product. It contained 7.9% by weight of methoxyl groups, 1.4% methylol groups, and was soluble in hot 80% ethanol. A film prepared by casting a solution of this polymer was tough and transparent.

The polyamides which may be treated by the general method described above include polyhexamethylene adipamide, polyhexamethylene sebacamide, and polyamides derived from epsilon-amino-caproic acid. In general, polyamides are linear synthetic resins having a recurring

group (X being oxygen or sulfur). Interpolymers of such polyamides may also be used. In the preparation of N-alkoxymethyl polyamides, alcohols in general condense with formaldehyde and the polyamide, suitable alcohols being methanol, ethanol, isopropanol, n-propanol and allyl alcohol. It is not necessary, although it is usually preferred, to use the same alcohol in the quenching bath as in the condensation mixture. The acid-reacting condensation catalyst include formic, acetic, oxalic, trimethylacetic, benzoic, sulfuric, p-toluenesulfonic, hydroxyacetic, and maleic acids. Control over the degree of substitution of the carbonamide hydrogens may be by any convenient method, such as by limiting the ratio of alcohol or formaldehyde to polyamide in the reaction mixture. Increasing the water content of the condensation mixture usually is effective in reducing the amount of substitution. Of further aid in controlling substitution and decomposition reactions is the precise control of the time that the reaction mixture remains acidic and at reaction temperature. This can be done most effectively by keeping the reaction mixture alkaline up to the time at which the reaction is to take place, at which time the catalyst is rapidly added. The reaction is quickly stopped by dilution, cooling, and/or neutralization of the acid catalyst.

The condensation reaction may be conducted in any suitable apparatus, such as a stirred autoclave, made of or lined with acid-resisting materials including nickel, stainless steel, silver, glass, and the like.

The granulation method herein disclosed is most effective with N-alkoxymethyl polyamides which are readily soluble in alcohol, and preferably in which the polyamides have between 20 and 45% of the carbonamide hydrogens substituted by the alkoxymethyl groups. The method is less effective when the degree of carbonamide substitution is high (45 to 50%), because these resins, after precipitation, redisperse with considerable difficulty. It is further preferred that the N-alkoxymethyl polyamide solutions from which the modified polyamides are precipitated by the method of this invention contain less than 25% polymer. The amount of water added during the first stage of the granulation operation must be carefully controlled so as to yield not a hardened resin but a dispersion of soft slime. The amount of water required for this varies with the alcohol content of the solution, and also with the N-alkoxymethyl content of the resin. The higher the N-alkoxymethyl content of the resin, the larger is the amount of water required to produce the desired dispersion.

The granular N-alkoxymethyl polyamides prepared in accordance with this invention are useful in the manufacture of molded products, foils, filaments, bristles, coatings, self-sealing fuel cells, electrical insulation and the like. As thermosetting resins, the N-alkoxymethyl polyamides may be used in compositions containing other resin ingredients such as urea, melamine, methylene diurea, thiourea, etc., or the methylol or alkoxymethyl derivatives of these compounds.

It is to be understood that many apparently different embodiments of the present invention may be made without departing from the spirit and scope thereof, and that accordingly we do not limit ourselves except as set forth in the appended claims.

We claim:

1. A process for preparing granular N-alkoxymethyl polyamides which comprises condensing a polyamide at a temperature of 100° to 155° C. with formaldehyde and a monohydric alkanol having not more than three carbon atoms in the presence of an acid condensation catalyst of the class consisting of phosphoric, formic, acetic, oxalic, trimethylacetic, benzoic, sulfuric, p-toluene-sulfonic, hydroxyacetic and maleic acids, said polyamide being a linear polymer in which all of the amide groups are combined in the form of intralinear carbonamide groups of the formula $$-\underset{\underset{O}{\|}}{C}-\underset{\underset{H}{|}}{N}-$$

recurring along the chain, the average number of carbon atoms in the segments separating the amide groups of the chain being at least 2, continuing the condensation reaction until 20% to 45% of the carbonamide hydrogens have been substituted by alkoxymethyl groups, quenching the resulting solution of the condensation product by mixing it with an alcoholic solution containing a sufficient quantity of ammonia to neutralize the said acid catalyst, said alcoholic solution containing as solvent a monohydric alkanol having not more than three carbon atoms adding slowly with agitation a controlled amount of water to the thus quenched solution containing less than 25% of the alkoxymethyl polyamide, whereby a slimy dispersion is produced, stopping the addition of water, and agitating the slimy dispersion until it agglomerates, thereafter continuing the agitation whereby the resultant agglomerated mass redisperses, adding a further quantity of water which hardens the thus obtained redispersed particles, and separating the hardened particles from the mother liquor.

2. A process for preparing granular N-alkoxymethyl polyamides which comprises condensing a polyamide with formaldehyde and a monohydric alkanol having not more than three carbon atoms in the presence of an acid condensation catalyst of the class consisting of phosphoric, formic, acetic, oxalic, trimethylacetic, benzoic, surfuric, p-toluenesulfonic, hydroxyacetic and maleic acids, said polyamide being a linear polymer in which all of the amide groups are combined in the form of intralinear carbonamide groups of the formula $$-\underset{\underset{O}{\|}}{C}-\underset{\underset{H}{|}}{N}-$$

recurring along the chain, the average number of carbon atoms in the segments separating the amide groups of the chain being at least two, quenching the resulting solution of condensation product by mixing it with a methanol solution of aqueous ammonia, said solution containing sufficient ammonia to neutralize the condensation catalyst, adding slowly with agitation a controlled amount of water to the thus quenched solution containing less than 25% of the alkoxymethyl polyamide whereby a slimy dispersion is produced, stopping the addition of water, and agitating the slimy dispersion until it agglomerates, thereafter continuing the agitation whereby the resulting agglomerated mass redisperses, adding a further quantity of water which hardens the redispersed particles, and separating the hardened particles from the mother liquor.

3. A process for preparing granular N-methoxymethyl polyhexamethylene adipamides which comprises condensing polyhexamethylene-adipamide with formaldehyde and methanol at a temperature of 100° to 150° C. in the presence of an acid condensation catalyst of the class consisting of phosphoric, formic, acetic, oxalic, trimethylacetic, benzoic, sulfuric, p-toluenesulfonic, hydroxyacetic and maleic acids until 20 to 45% of the carbonamide hydrogens have been substituted by methoxymethyl groups, quenching the resulting solution of condensation product by mixing it with a methanolic solution of aqueous ammonia, said solution containing enough ammonia to neutralize the condensation catalyst, adding slowly with agitation a controlled amount of water to the thus quenched solution containing less than 25% of methoxymethyl polyamide whereby a slimy dispersion is produced, stopping the addition of water and agitating the slimy dispersion until it agglomerates, thereafter continuing the agitation whereby the resultant agglomerated mass redisperses, adding a further quantity of water which hardens the thus obtained redispersed particles, and separating the hardened particles from the mother liquor.

HENRY D. FOSTER.
ARTHUR W. LARCHAR.

REFERENCES CITED

The following references are of record in the file of this patent:

UNITED STATES PATENTS

| Number | Name | Date |
|---|---|---|
| 2,244,184 | Austin et al. | June 3, 1941 |
| 2,173,005 | Strain | Sept. 12, 1939 |

FOREIGN PATENTS

| Number | Country | Date |
|---|---|---|
| 542,128 | Great Britain | Dec. 29, 1941 |